(12) United States Patent
Møller Hansen

(10) Patent No.: US 9,726,209 B2
(45) Date of Patent: Aug. 8, 2017

(54) JOINTING FOR A FURNITURE LEG ELEMENT

(71) Applicant: SISO A/S, Skovlunde (DK)

(72) Inventor: Jesper Møller Hansen, Holte (DK)

(73) Assignee: SISO A/S, Skovlunde (DK)

( * ) Notice: Subject to any disclaimer, the term of this patent is extended or adjusted under 35 U.S.C. 154(b) by 101 days.

(21) Appl. No.: 14/770,346

(22) PCT Filed: Mar. 4, 2013

(86) PCT No.: PCT/IB2013/051703
§ 371 (c)(1),
(2) Date: Aug. 25, 2015

(87) PCT Pub. No.: WO2014/135919
PCT Pub. Date: Sep. 12, 2014

(65) Prior Publication Data
US 2016/0003276 A1     Jan. 7, 2016

(51) Int. Cl.
*F16B 12/44*     (2006.01)
*A47B 13/02*     (2006.01)
(Continued)

(52) U.S. Cl.
CPC ............... *F16B 12/44* (2013.01); *A47B 9/16* (2013.01); *A47B 13/003* (2013.01);
(Continued)

(58) Field of Classification Search
CPC ..... Y10T 403/32286; Y10T 403/32581; F16B 12/44; A47C 7/00; A47C 1/032;
(Continued)

(56) References Cited

U.S. PATENT DOCUMENTS 3,334,930 A * 8/1967 Larson ................. A47B 3/0818
108/125
3,870,265 A * 3/1975 Osborne ................. F16M 11/10
248/183.2

(Continued)

FOREIGN PATENT DOCUMENTS

DE          19960199 A1    6/2001
DE     102007060543 B3    10/2008

OTHER PUBLICATIONS

International Search Report, issued in PCT/IB2013/051703, dated Dec. 2, 2013.

(Continued)

*Primary Examiner* — Joshua J Michener
*Assistant Examiner* — Matthew Gitlin
(74) *Attorney, Agent, or Firm* — Birch, Stewart, Kolasch & Birch, LLP

(57) ABSTRACT

The invention pertains to a jointing 2 for a furniture leg element 4, the jointing comprising: a base part 6 configured to be attached to a furniture, the base part 6 comprising a convex outer surface 8, which during use faces the leg element 4, and which outer surface 8 further comprises an elongated hole 10 defining a longitudinal extension 12 and a transversal extension 14, an elongated threaded top part 16 configured to be fixed to the leg element 4 and having a cross sectional dimension not exceeding the transversal extension 14 of the hole 10, and a sliding element 18 configured to slide along the inner side 34 of the convex outer surface 8 the base part 6 and having a threaded aperture 20 configured for cooperating with the threaded top part 16 in such a way that the leg element 4 is fixed to the base part 6 by screwing the top part 16 in the sliding element 18, and thereby enabling the leg element 4 to be fixed at a certain angle (Continued)

relative to the furniture. The invention also pertains to a piece of furniture comprising such a jointing 2.

20 Claims, 6 Drawing Sheets

(51) Int. Cl.
*A47B 9/16* (2006.01)
*A47B 13/00* (2006.01)
*A47B 95/00* (2006.01)
*A47C 7/00* (2006.01)

(52) U.S. Cl.
CPC ............ *A47B 13/021* (2013.01); *A47B 95/00* (2013.01); *A47C 7/00* (2013.01)

(58) Field of Classification Search
CPC ........... A47C 1/024; A47C 1/022; A47B 9/16; A47B 13/003; A47B 95/00; A47B 13/021; B60N 2/02; B60N 2/10; B60N 2/68; B60N 2/1839; B60N 2/22; B60N 2002/0208; B60N 2/39
USPC .................. 248/143, 144, 188.3, 188, 188.1; 297/327, 313, 344.14, 461; 108/150, 1, 108/4, 5, 6, 8
See application file for complete search history.

(56) References Cited

U.S. PATENT DOCUMENTS

| | | | | |
|---|---|---|---|---|
| 4,068,961 A | * | 1/1978 | Ebner | F16C 11/0661 248/181.1 |
| 4,620,813 A | * | 11/1986 | Lacher | F16C 11/106 248/182.1 |
| 4,695,180 A | * | 9/1987 | Saito | B60S 1/24 15/250.17 |
| 5,807,010 A | * | 9/1998 | Parker | B60G 21/0551 280/124.107 |
| 5,897,417 A | * | 4/1999 | Grey | A63H 33/062 403/340 |
| 7,226,028 B2 | * | 6/2007 | Lin | F16C 33/102 248/291.1 |
| 7,334,956 B2 | * | 2/2008 | Taylor | B63B 35/815 114/361 |
| 8,246,266 B2 | * | 8/2012 | Lang | B60R 1/066 359/874 |
| 8,753,030 B2 | * | 6/2014 | Leonhardt | F16M 11/10 248/276.1 |
| 8,845,755 B2 | * | 9/2014 | Dillingham | A61F 2/60 403/87 |
| 2004/0227049 A1 | * | 11/2004 | Lang | B60R 1/066 248/476 |
| 2005/0128612 A1 | * | 6/2005 | Ro | G02B 7/1827 359/879 |
| 2009/0151605 A1 | | 6/2009 | Buhler | |

OTHER PUBLICATIONS

PCT/IPEA/408 Written Opinion of the International Preliminary Examining Authority, issued in PCT/IB2013/051703, dated Feb. 2, 2015.
Written Opinion of the International Searching Authority, issued in PCT/IB2013/051703, dated Dec. 2, 2013.

* cited by examiner

JOINTING FOR A FURNITURE LEG ELEMENT

TECHNICAL FIELD

The present invention pertains to a jointing for a furniture leg element.

BACKGROUND OF THE INVENTION

Various kinds of leg jointings for furniture are known in the art, among which are leg jointings for mounting a leg in a position which is not perpendicular to the furniture itself or the surface onto which the furniture is to be placed.

For example in U.S. Pat. No. 3,516,633 a furniture leg mount is disclosed. The leg mount includes a T-nut having a head disposed on one side of a furniture support member and projecting at a predetermined angle toward the opposite surface of the member. A circular leg-supporting wedge has one face lying flatly against said opposite surface of the support member, and the opposite face of the wedge is parallel to the upper end of the leg. A stud projecting perpendicularly from said upper end of the leg is received through an opening in the wedge and threadably engages the T-nut to secure the leg to the member with the wedge interposed there between. A lug on the wedge is received in a depression in the member to prevent rotation of the wedge when the leg is tightened towards the member. This wedge-formed bracket enables the leg to be placed at an angle that is not right with respect to the furniture. This angle is fixed and defined by the shape of the wedge.

In German utility model DE 9 200 715 U is disclosed an adjustable bracket for tables or similar furniture. The bracket consists of an upper and a lower part, which are pivotable in relation to a vertical axis. Each part has a horizontally protruding coupling arm for coupling a horizontal support beam of a desk or the like, whereby the upper part and the lower part continuously rotate freely against each other. Only by fixing the bracket and/or the associated support beams on the table top, their respective angular position are determined. Hereby the leg of the table is locked in a desired angular position relative to the table top.

In SE 445 945 is disclosed a device for multi-sectional furniture with legs, especially tables, and of the type where the sections are connected to each other by means of fittings situated in the joint between two adjacent, leaf-shaped furniture sections. Each fitting is designed as a mounting for a detachable leg. The fitting and corresponding leg are designed with bayonet catches, where one part of the catch has at least one L-shaped groove, and the other has at least one pin that fits in the groove.

Despite the huge number of different joints for furniture leg elements known in the art, most of these joints are designed for a specific purpose or function or a specific shape of the legs. They are also either not adjustable or rather complicated to produce and mount.

In DE 199 60 199 is disclosed a jointing for a table leg with adjustable inclination. The leg is retained on the joint by clamping forces. The leg is lockable in different rotational positions relative to the joint by means of a connecting assembly comprising a clamping plate, screw and ring.

In DE 10 2007 060543 is disclosed is a table with a table top which is connected via a table leg to a pedestal which can be placed on the ground. Between the table top and the pedestal is arranged a swivel joint, by means of which the table top is pivotable relative to the pedestal about at least one swivel axis aligned perpendicular to the lengthwise extension of the table leg. The table has a catch device adjustable between an open position and a closed position for the swivel joint by means of which the table top is fixable in different swivel positions relative to the pedestal. The table top is connected so that it is rotatable about a rotation axis oriented more or less perpendicular to its horizontal plane and is drive connected to the catch device so that said catch device is adjustable between the open position and the closed position by turning the table top about the rotation axis.

SUMMARY OF THE INVENTION

It is thus an object of the present invention to provide a versatile jointing for a furniture leg element, enabling an individual adjustment of the angle which the leg element forms relative to said furniture and the ground.

According to the present invention, the above-mentioned and other objects are fulfilled by a jointing for a furniture leg element, the jointing comprising the following main elements:
  a base part configured to be attached to a furniture, the base part comprising a convex outer surface, which during use faces the leg element, and which outer surface further comprises an elongated hole defining a longitudinal extension and a transversal extension,
  an elongated threaded top part configured to be fixed to the leg element and having a cross-sectional dimension not exceeding the transversal extension of the hole, and
  a sliding element configured to slide along the inner side of the convex outer surface of the base part and having a threaded aperture configured for cooperating with the threaded top part in such a way that the leg element is fixed to the base part by screwing the top part in the sliding element, and thereby enabling the leg element to be fixed at a certain angle relative to the furniture.

The leg element will extend substantially perpendicular from said outer convex surface. This implies that the angle it forms in relation to the part of the furniture to which the base part is attached will depend of the position of the elongated threaded top part in the elongated hole. Since the a sliding element has a threaded aperture configured for cooperating with the threaded top part in such a way that the leg element is fixed to the base part by screwing the top part in the sliding element, it is possible to fixate the leg element in the desired position, i.e. at the desired angle relative to the part of the furniture to which the base part is attached. A great advantage of this invention is that it makes it possible to fix the leg element at an arbitrary angle within the range ultimately determined by the length and position of the elongated hole, and this adjustment can furthermore be made step-less. This makes it possible even to account for minor roughness in the floor by adjusting the angle of the leg element accordingly. Furthermore, each leg can be adjusted individually. It is understood that in one embodiment the leg element is simply a furniture leg or a part of a furniture leg.

In an embodiment of the jointing according to the invention, the outer convex surface of the base part is formed as a ball cut or as a part of an ellipsoid. Hereby is achieved a very smooth and step-less transition between the various angles with which it is possible to position the leg element relative to the part of the furniture to which the base part is attached.

According to the invention, the sliding element has a dimension which is larger than the transversal extension of the hole. Hereby it is ensured that the sliding element together with the threaded top part does not fall out of the base part during use.

Preferably, the surface of the sliding element that faces the inner side of the convex surface has the same curvature as said inner side of the convex surface.

According to the invention, the base part further comprises two sidewall sections extending from the inner side of the convex surface and placed on each side of the longitudinal hole, said sidewall sections being substantially parallel to the longitudinal extension of the hole for guiding the movement of the sliding element during adjustment of the angle, which the leg element forms relative to the furniture. In addition to functioning as guiding elements, said sidewalls ensure that the threaded aperture of the sliding element is coinciding with the elongated hole, thereby aiding in a quick and easy attachment of the leg element to the sliding element via the elongated threaded top part, which is screwed in to the aperture in the sliding element. Preferably, the sidewalls are placed at such a distance from the elongated sides of the hole that the sliding element is guided between them without so much leverage that the threading of the elongated top part can touch the side edges of the hole during use. Hereby wear and destruction of the threading on the elongated top part can be precluded.

According to the invention, the base part further comprises two end wall sections extending from the inner side of the convex surface and placed adjacent to each end of the longitudinal hole, said end wall sections being substantially perpendicular to the longitudinal extension of the hole. These end wall sections work as a stopper, and are preferably placed at such a distance from the ends of the elongated hole that they will prevent the threaded parts of the elongated top part to touch the edges of the hole, which thereby can destroy the threading. Together with the sidewalls, these end walls function as a grove for the sliding element to slide within.

In a further embodiment of the jointing according to the invention, the base part further comprises an anchoring element placed between the two sidewalls. This anchoring element is configured for holding and guiding the sliding element.

In a further embodiment of the jointing according to the invention, the anchoring element has two parallel anchor walls, each of which anchor walls is configured to be in abutment to a corresponding one of the sidewalls of the base part.

In a further embodiment of the jointing according to the invention, the two parallel anchor walls are connected via a bottom surface, which is equipped with an elongated hole corresponding to the elongated hole in the outer convex surface of the base part, and where said bottom surface has such a form and curvature that during use it abuts to, and follows, the curvature of the inner concave surface of the base part.

In a further embodiment of the jointing according to the invention, each of the two anchor walls is equipped with one or more guiding protrusions extending perpendicularly from said anchor walls.

In a further embodiment of the jointing according to the invention, said guiding protrusions are placed at a distance from the bottom surface that corresponds to the height of the sliding element.

By the use of an anchoring element as described above, a more reliable and controlled guidance of the sliding element is achieved. Especially, the guiding protrusions extending perpendicularly from the anchor walls will ensure that the sliding element always will be aligned with the elongated hole in the outer convex surface of the base part, whereby attachment of the threaded elongated top part to the sliding element is more easily and effectively facilitated.

In a further embodiment of the jointing according to the invention, the outer convex surface of the base part is provided with markings, which during use are configured for indicating the angular position of the leg element. Hereby is ensured that a user can adjust all the legs of the same furniture to have the same angle relative to the part of the furniture to which the base part is attached.

In a further embodiment, the jointing according to the invention further comprises an annular washer to be placed between the convex outer surface of the base part and the leg element. Hereby is ensured that the leg part is not so easily loosened from the base part. Preferably, the annular washer has an inner surface, which during use is configured to be facing the outer convex surface of the base part, said inner surface being concave and having a smaller radius of curvature (preferably, slightly smaller radius of curvature) than said outer convex surface of the base part. Hereby it is achieved that the annular washer will work as a feathering washer between the leg element and the base part. This will ensure an even tighter fixation of the leg element to the base part.

The above mentioned objects are also obtained by a piece of furniture comprising a plurality of leg elements and jointings for connecting each of the leg elements to a main part of the furniture, wherein each jointing comprises:

a base part attached to the main part of the furniture, the base part comprising a convex outer surface, which during use faces one of the leg elements, and which outer surface further comprises an elongated hole defining a longitudinal extension and a transversal extension, an elongated threaded top part fixed to said leg element and having a cross-sectional dimension not exceeding the transversal extension of the hole, and a sliding element configured to slide along the inner side of the convex outer surface of the base part and having a threaded aperture configured for cooperating with the threaded top part in such a way that said leg element is fixed to the base part by screwing the top part in the sliding element, and thereby enabling said leg element to be fixed at a certain angle relative to the main part of the furniture.

In an embodiment of the furniture according to the invention, the outer convex surface of the base part is formed as a ball cut.

In the furniture according to the invention, the sliding element has a dimension which is larger than the transversal extension of the hole.

In a further embodiment of the furniture according to the invention, the surface of the sliding element that faces the inner side of the convex surface has the same curvature as said inner side of the convex surface.

In the furniture according to the invention, wherein the base part further comprises two sidewall sections extending from the inner side of the convex surface and placed on each side of the longitudinal hole, said sidewall sections are substantially parallel to the longitudinal extension of the hole for guiding the movement of the sliding element during adjustment of the angle which said leg element forms relative to the furniture.

In the furniture according to the invention, wherein the base part further comprises two end wall sections extending from the inner side of the convex surface and placed adjacent to each end of the longitudinal hole, said end wall sections are substantially perpendicular to the longitudinal extension of the hole.

In a further embodiment of the furniture according to the invention, the base part further comprises an anchoring element placed between the two sidewalls, the anchoring element being configured for holding and guiding the sliding element.

In a further embodiment of the furniture according to the invention, the anchoring element has two parallel anchor walls, each of which anchor walls is configured to be in abutment to a corresponding one of the sidewalls of the base part.

In a further embodiment of the furniture according to the invention, the two parallel anchor walls are connected via a bottom surface, which is equipped with an elongated hole corresponding to the elongated hole in the outer convex surface of the base part, and where said bottom surface has such a form and curvature that during use it abuts to, and follows, the curvature of the inner concave surface of the base part.

In a further embodiment of the furniture according to the invention, each of the two anchor walls is equipped with one or more guiding protrusions extending perpendicularly from said anchor walls.

In a further embodiment of the furniture according to the invention, said guiding protrusions are placed at a distance from the bottom surface that corresponds to the height of the sliding element.

In a further embodiment of the furniture according to the invention, the outer convex surface of the base part is provided with markings, which during use are configured for indicating the angular position of the leg element.

In a further embodiment, the furniture may further comprise an annular washer to be placed between the convex outer surface of the base part and the leg element.

In a further embodiment of the furniture according to the invention, the main part of the furniture is a table top or a frame element attached to a table top, and the leg element is a table leg.

In a further embodiment of the furniture according to the invention, the main part of the furniture is a chair seat or a frame element attached to a chair seat, and the leg element is a chair leg.

In a further embodiment of the furniture according to the invention, the furniture is a dresser or cabinet.

BRIEF DESCRIPTION OF THE DRAWINGS

A further understanding of the nature and advantages of the present invention may be realized by reference to the remaining portions of the specification and the drawings. In the following, preferred embodiments of the invention are explained in more detail with reference to the drawings, wherein.

DETAILED DESCRIPTION

Figure 1:
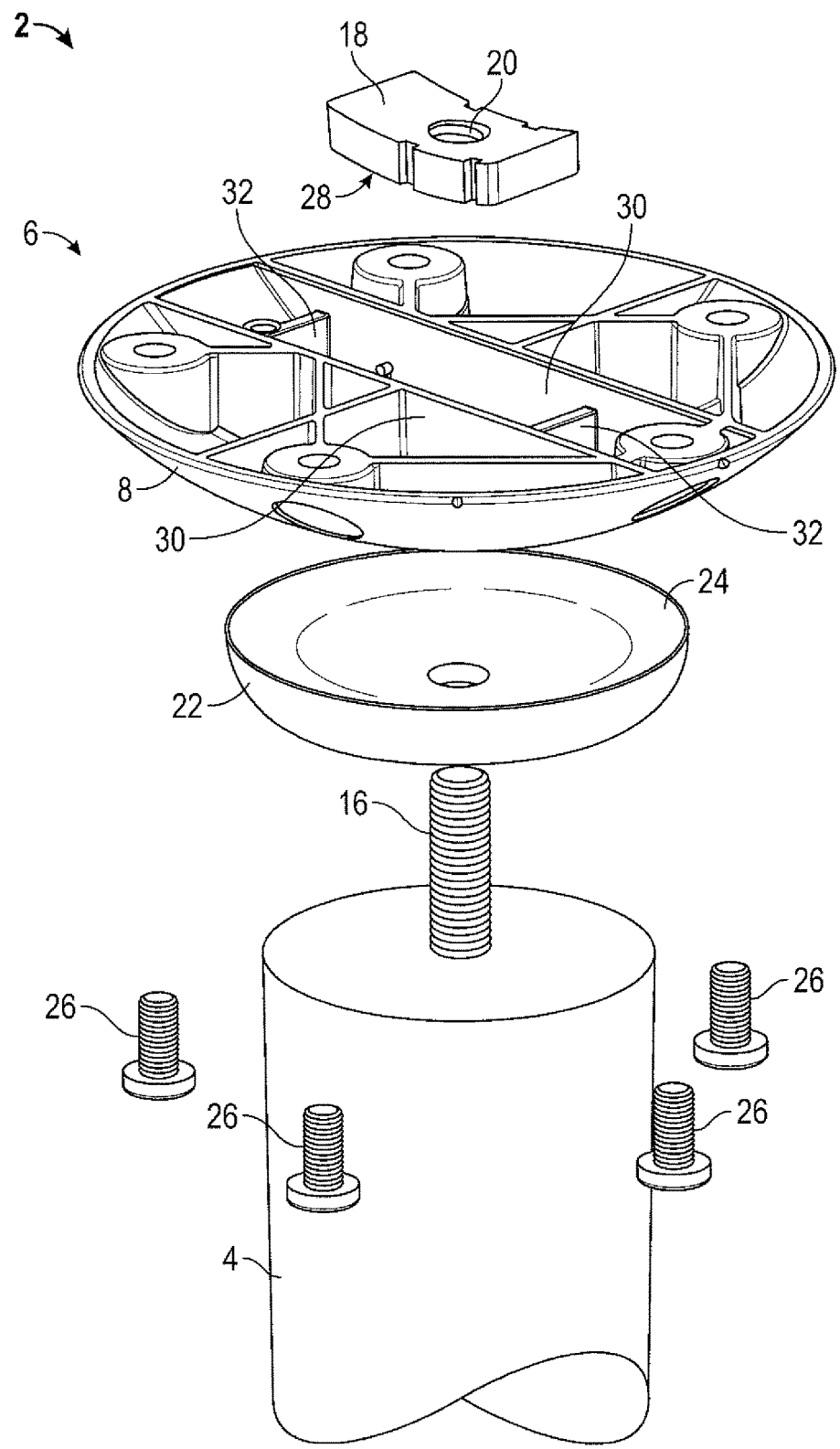
FIG. 1 shows an explosive view of an embodiment of a jointing according to the invention.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Like elements will thus not be described in detail with respect to the description of each figure.

FIG. 1 shows an explosive view of an embodiment of a jointing 2 according to the invention. The illustrated jointing 2 is attached to a furniture leg element 4, the jointing comprising a base part 6 configured to be attached to a piece of furniture (not shown). The base part 6 has a convex outer surface 8, which during use faces the leg element 4. As can be seen more clearly in FIG. 4, the outer surface 8 further comprises an elongated hole 10 defining a longitudinal extension 12 and a transversal extension 14. The jointing 2 further comprises an elongated threaded top part 16 configured to be fixed to the leg element 4 and having a cross-sectional dimension not exceeding the transversal extension 14 of the hole 10. Also illustrated is a sliding element 18 configured to slide along the inner side 34 (see FIG. 2 and FIG. 3) of the convex outer surface 8 of the base part 6 and having a threaded aperture 20 configured for cooperating with the threaded top part 16 in such a way that the leg element 4 is fixed to the base part 6 by screwing the threaded top part 16 in the sliding element 18, and thereby enabling the leg element 4 to be fixed at a certain angle relative to the furniture.

Also illustrated in FIG. 1 is an optional annular washer 22 to be placed between the convex outer surface 8 of the base part 6 and the leg element 4. Hereby is ensured that the leg element 4 is not so easily loosened from the base part 6 during use. Preferably, the annular washer 22 has an inner surface 24, which during use is configured to be facing the outer convex surface 8 of the base part 6, said inner surface 24 being concave and having a smaller radius of curvature (preferably, slightly smaller radius of curvature) than said outer convex surface 8 of the base part 6. Hereby it is achieved that the annular washer 22 will work as a feathering washer 22 between the leg element 4 and the base part 6. This will ensure an even tighter fixation of the leg element 4 to the base part 6. In the illustrated embodiment the base part 6 is to be attached to a piece of furniture by screws 26. The surface 28 of the sliding element 18 that faces the inner side 34 (see FIG. 2 and FIG. 3) of the convex surface 8 has the same curvature as said inner side 34 of the convex surface 8.

The base part 6 further comprises two sidewall sections 30 extending from the inner side of the convex surface 8 and placed on each side of the longitudinal hole 10. These sidewall sections 30 are substantially parallel to the longitudinal extension 12 of the hole 10 for guiding the movement of the sliding element 18 during adjustment of the angle which the leg element 4 forms relative to the furniture. In addition to functioning as guiding elements, said sidewalls 30 ensure that the threaded aperture 20 of the sliding element 18 is coinciding with the elongated hole 10, thereby aiding in a quick and easy attachment of the leg element 4 to the sliding element 18 via the elongated threaded top part 16, which is screwed into the aperture 20 in the sliding element 18. Preferably, these sidewalls 30 are placed at such a distance from the elongated sides of the hole 10 that the sliding element 18 is guided between them without so much leverage that the threading of the elongated top part 16 can touch the side edges of the hole 10 during use. Hereby wear and destruction of the threading on the elongated top part 16 can be precluded.

As illustrated, the base part 6 further comprises two end wall sections 32 extending from the inner side of the convex surface 8 and placed adjacent to each end of the longitudinal hole 10. These end wall sections 32 are substantially perpendicular to the longitudinal extension 12 of the hole 10, and they (32) work as a stopper, and are preferably placed at such a distance from the ends of the elongated hole 10 that they will prevent the threaded parts of the elongated top part 16 from touching the edges of the hole, which thereby can destroy the threading. Together with the sidewalls 30, these end walls 32 function as a grove for the sliding element 18 to slide within.

Figure 2:
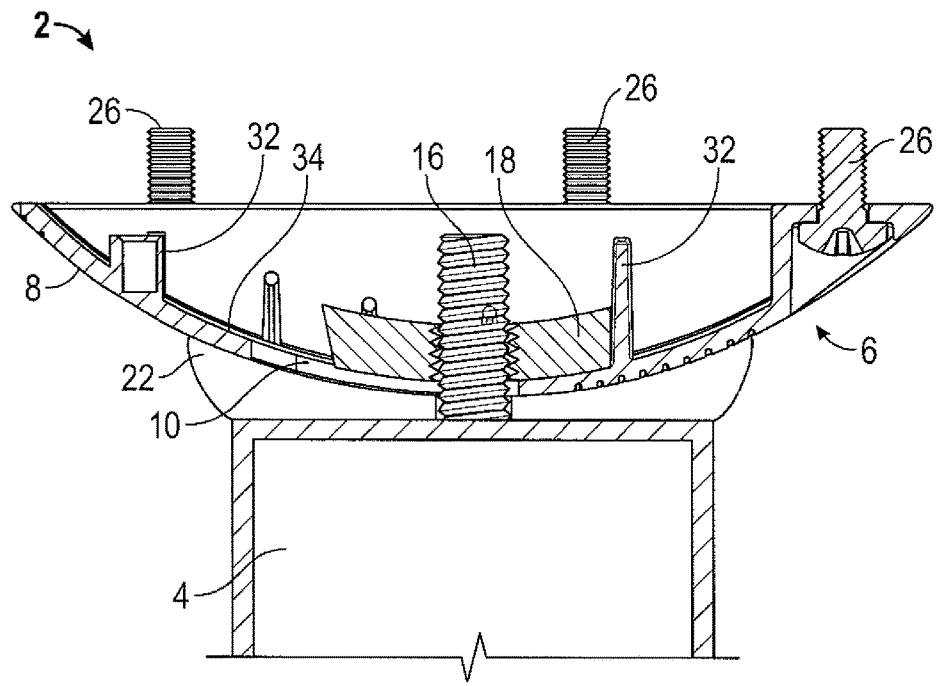
FIG. 2 shows a leg element fixed to the jointing in the center position.
Figure 3:
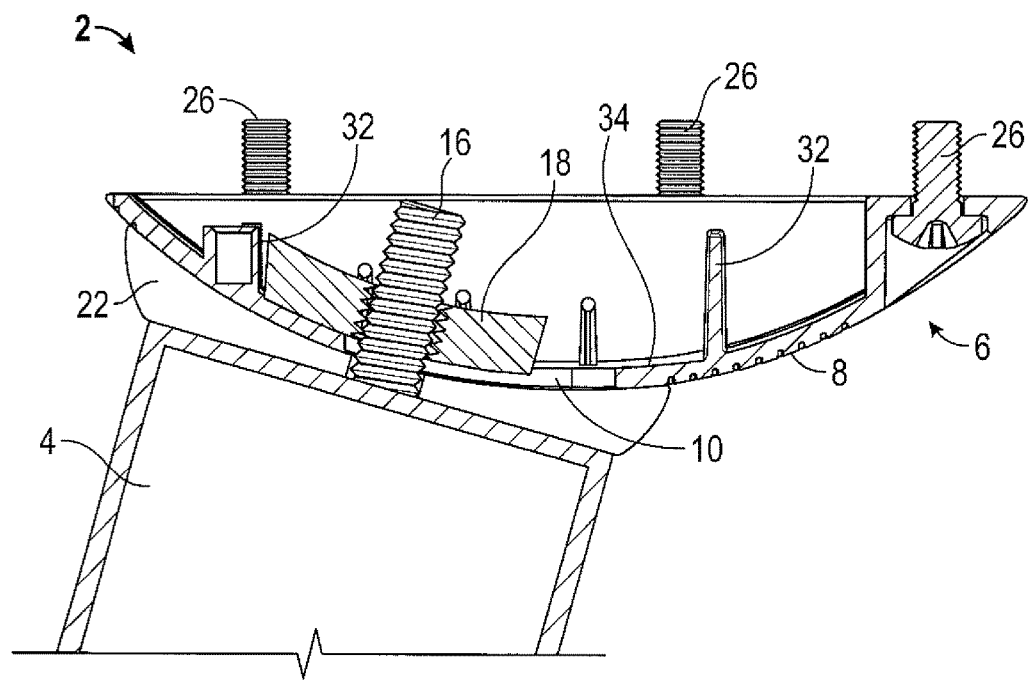
FIG. 3 illustrates a leg element that is fixed to the jointing in an off-centered position.

FIG. 2 shows a leg element 4 fixed to the jointing in the center position, and FIG. 3 illustrates a leg element 4 which is fixed to the jointing 2 in an off-centered position. The leg element 4 will extend substantially perpendicular from the outer convex surface 8 of the base part 6. This implies that the angle it (the leg element 4) forms in relation to the part of the furniture (not shown) to which the base part 6 is attached will depend of the position of the elongated threaded top part 16 in the elongated hole 10. Since the sliding element 18 has a threaded aperture 20 configured for cooperating with the threaded top part 16 in such a way that the leg element 4 is fixed to the base part 6 by screwing the top part 16 in the sliding element 18, it is possible to fixate the leg element 4 in the desired position, i.e. at the desired angle relative to the part of the furniture to which the base part 6 is attached. A great advantage of this invention is that it makes it possible to fix the leg element 4 at an arbitrary angle within the range ultimately determined by the length 12 and position of the elongated hole 10. This adjustment can furthermore be made step-less. This makes it possible even to account for a minor roughness in the floor by adjusting the angle of the leg element 4 accordingly. Furthermore, each leg can be adjusted individually. It is understood that in one embodiment, the leg element is simply a furniture leg or a part of a furniture leg.

Figure 4:
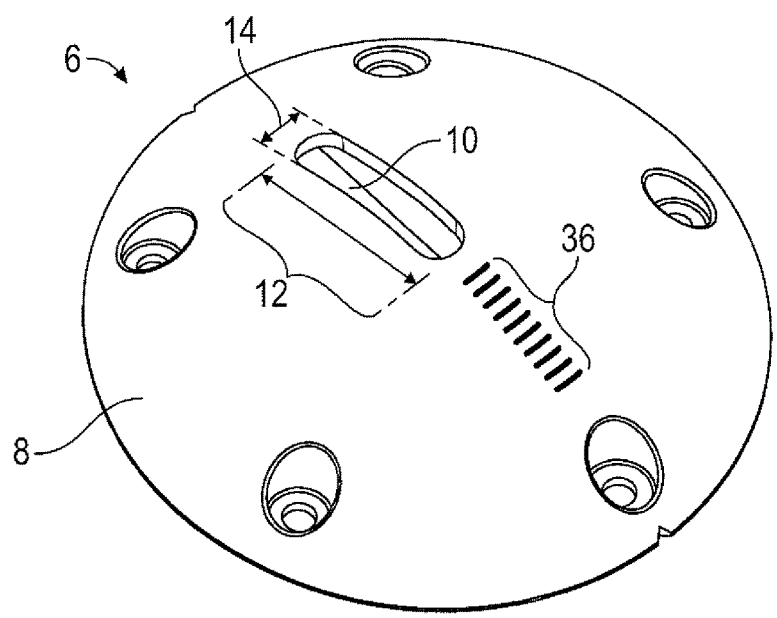
FIG. 4 shows another view of the base part.

FIG. 4 shows another view of the base part 6, wherein the elongated hole 10 is more clearly visible. In the illustrated embodiment, the outer convex surface 8 of the base part 6 is formed as a ball cut. However, other forms may be used, e.g. parts of an ellipsoid. Hereby is achieved a very smooth and step-less transition between the various angles with which it is possible to position the leg element 4 relative to the part of the furniture to which the base part 6 is attached.

The sliding element 18 (illustrated in FIGS. 1-3) has a dimension, which is larger than the transversal extension 14 of the hole 10. Hereby it is ensured that the sliding element 18 together with the threaded top part 16 does not fall out of the base part 6 during use.

The illustrated outer convex surface 8 of the base part 6 is provided with markings 36, which during use are configured for indicating the angular position of the leg element 4. Hereby is ensured that a user can adjust all the legs of the same furniture to have the same angle relative to the part of the furniture to which the base part 6 is attached.

Figure 5:
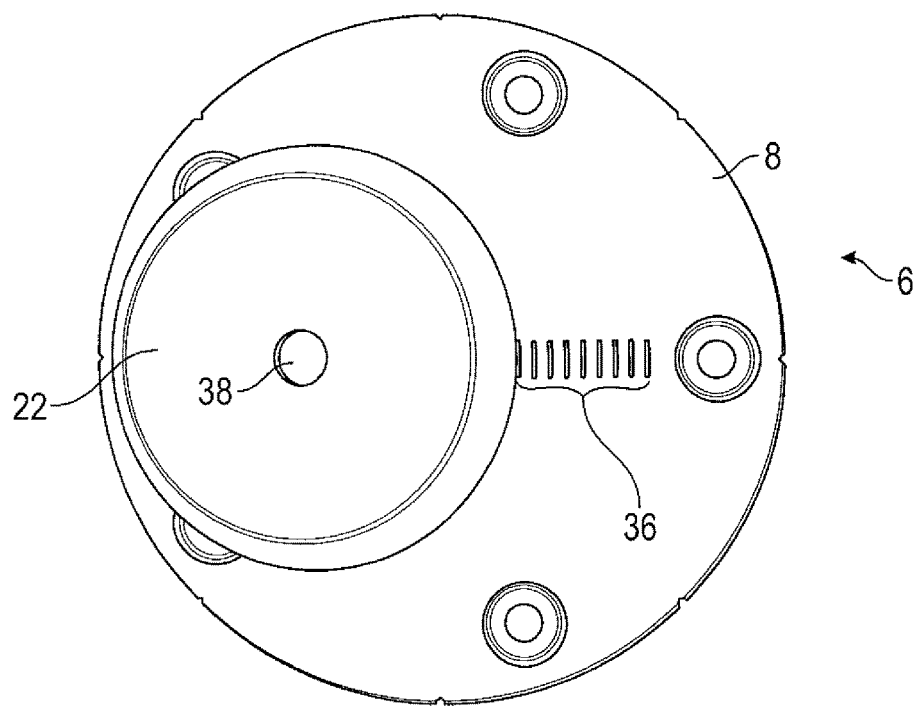
FIG. 5 illustrates how the annular washer can be used together with the markings to indicate the angular position of the leg element.

In FIG. 5 is illustrated how the annular washer 22 can be used together with the markings 36 to indicate the angular position of the leg element 4. In this illustration is also more clearly shown the center hole 38 in the annular washer 22 through which the elongated threaded top part is inserted during use.

Figure 6:
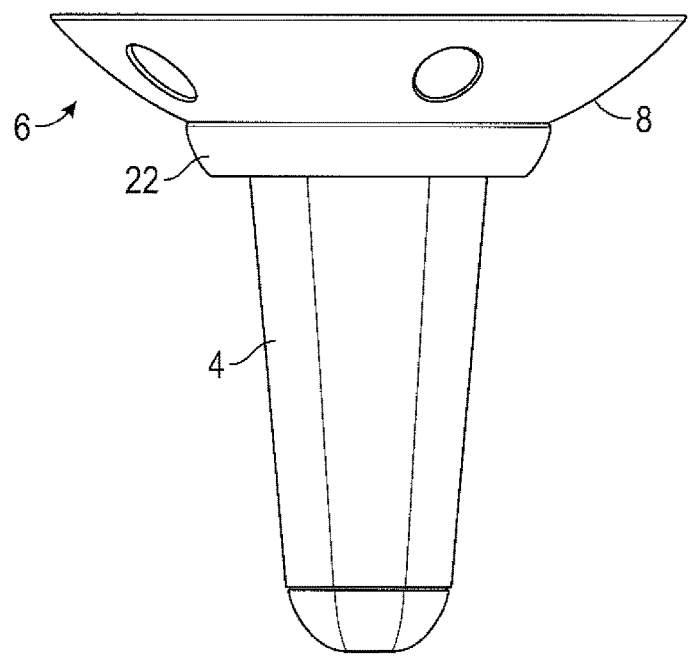
FIG. 6 shows a leg element for a dresser or a cabinet in a center position.
Figure 7:
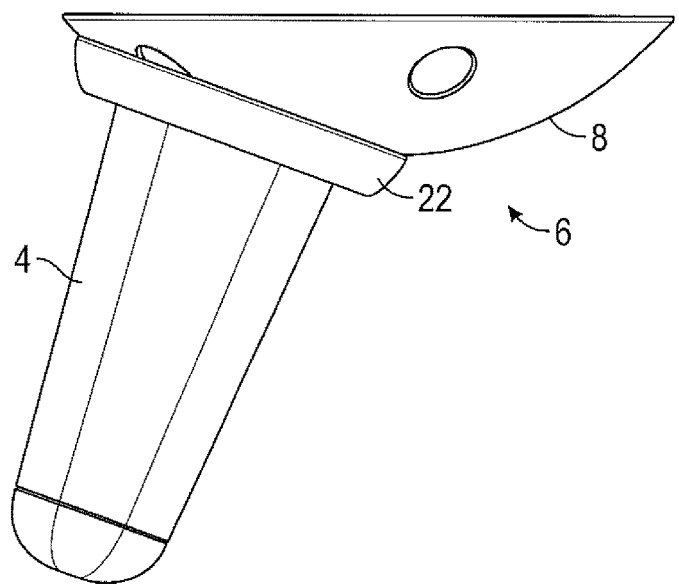
FIG. 7 shows a leg element for a dresser or a cabinet in a off-center position.

FIGS. 6 and 7 illustrates two leg elements for a dresser or a cabinet, where the leg element 4 is positioned in a center position and in an angular position.

Figure 8:
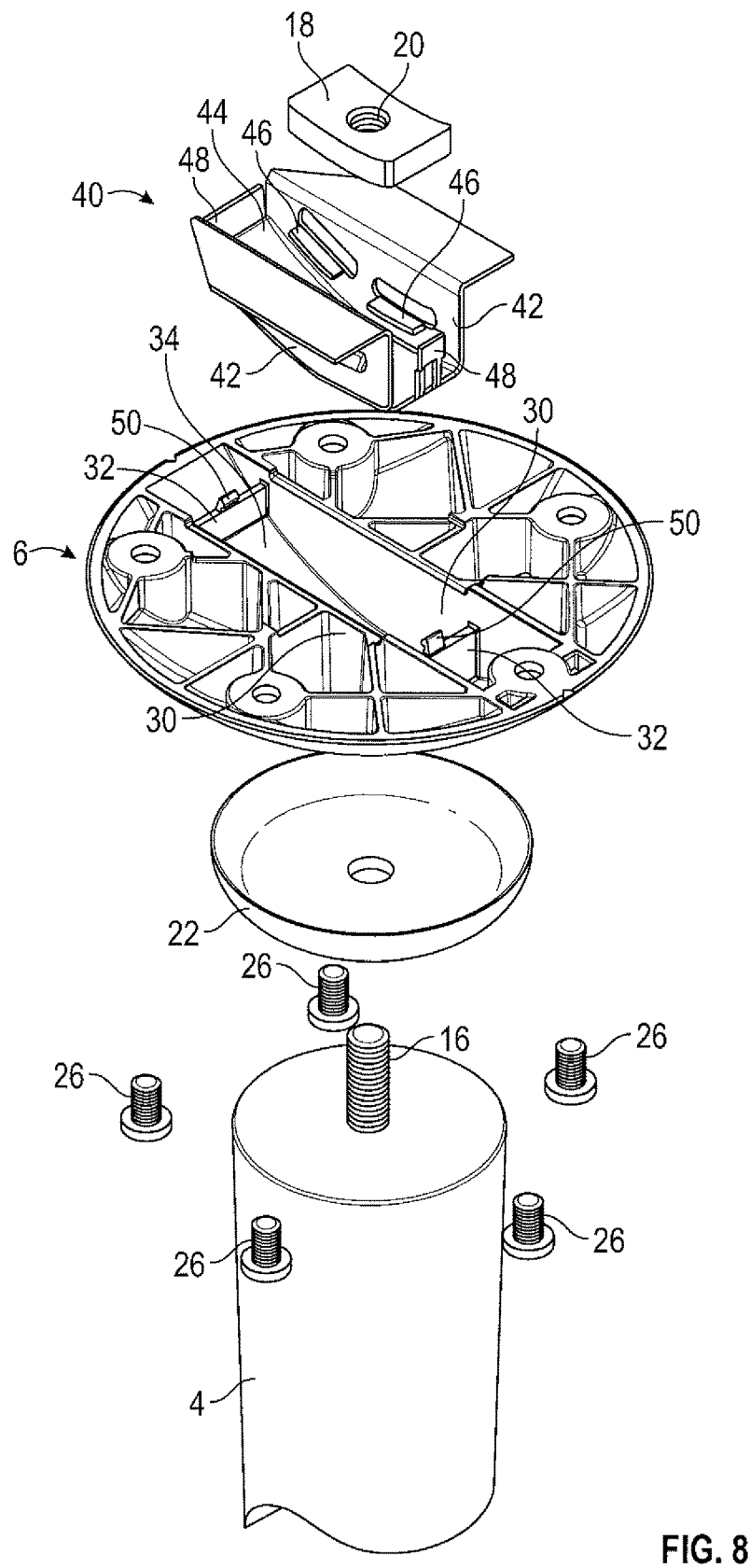
FIG. 8 shows an explosive view of another embodiment of a jointing according to the invention.

FIG. 8 shows an explosive view of another embodiment of a jointing 2 according to the invention. The embodiment illustrated in FIG. 8 has many similarities with the embodiment illustrated in FIG. 1. The difference between these embodiments is that the base part 6 illustrated in FIG. 8 further comprises an anchoring element 40 to be placed between the two sidewalls 30. This anchoring element 40 is configured for holding and guiding the sliding element 18.

The illustrated anchoring element 40 has two parallel anchor walls 42, each of which anchor walls 42 is configured to be in abutment to a corresponding one of the sidewalls 30 of the base part 6 during use. The two parallel anchor walls 42 are connected via a bottom surface 44, which is equipped with an elongated hole (not shown) corresponding to the elongated hole 10 in the outer convex surface 8 of the base part 6. This bottom surface 44 has such a form and curvature that it abuts to, and follows, the curvature of the inner concave surface 34 of the base part 6 during use.

Each of the two anchor walls 42 is equipped with two guiding protrusions 46 extending perpendicularly from said anchor walls 42. These guiding protrusions 46 are placed at a distance from the bottom surface 44 that corresponds to the height of the sliding element 18. In the illustrated embodiment, the guiding protrusions 46 are formed by a partly cut-out section of one of the anchor walls 42, and bent inwardly in a direction towards the opposing anchor wall 42. Also illustrated are the end connectors 48 of the anchoring element 40. These end connectors 48 are configured to cooperate with corresponding connectors 50 attached to or placed adjacent to the end walls 32 of the base part 6. The connectors 50 on the base part 6 are preferably leaf springs made from a suitable metal alloy, and having a tapered free end that can engage a part of the connectors 48 of the anchoring element 40 in such a way that they form a snap-fitting lock, when the anchoring element 40 is placed between the sidewalls 30 and the end walls 32 of the base part 6.

By the use of an anchoring element 40 as described above, a more reliable and controlled guidance of the sliding element 18 is achieved. Especially, the guiding protrusions 46 extending perpendicularly from the anchor walls 42 will ensure that the sliding element 18 always will be aligned with the elongated hole 10 in the outer convex surface 8 of the base part 6, whereby attachment of the threaded elongated top part 16 to the sliding element 18 is more easily and effectively facilitated.

Figure 9:
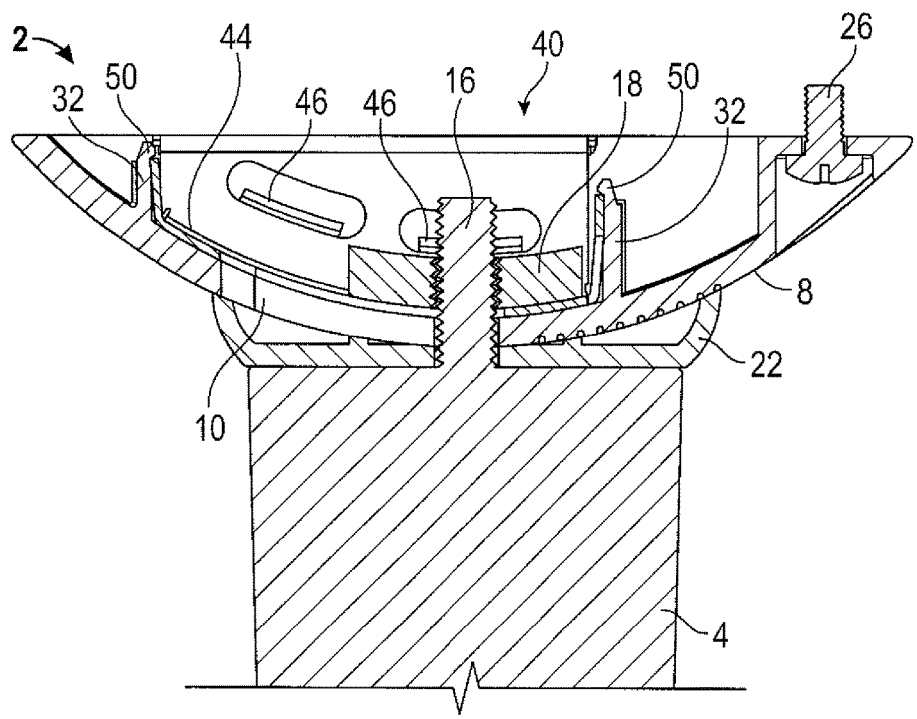
FIG. 9 shows a cross section of the embodiment of a jointing illustrated in FIG. 8, where the leg element is fixed to the jointing in the center position.
Figure 10:
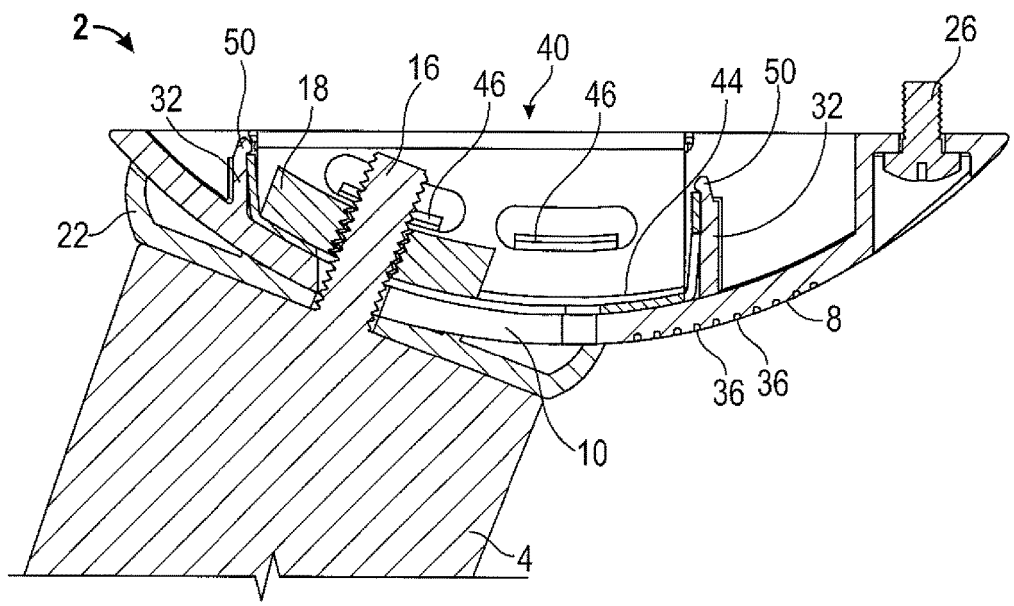
FIG. 10 shows a cross section of the embodiment of a jointing illustrated in FIG. 9, where the leg element is fixed to the jointing in the off-center position.

Similarly to the illustration shown in FIG. 2, FIG. 9 shows a cross section of the embodiment of the jointing 2 illustrated in FIG. 8, where the leg element 4 is fixed to the jointing 2 in the center position, and similarly to FIG. 3, FIG. 10 shows a cross section of the embodiment of the jointing 2 illustrated in FIG. 8, where the leg element 4 is fixed to the jointing 2 in the off-center position.

LIST OF REFERENCE NUMBERS

In the following is given a list of reference numbers that are used in the detailed description of the invention.
2 jointing,
4 leg element,
6 base part,
8 convex outer surface of base part,
10 elongated hole in the convex outer surface of base part,
12 longitudinal extension of the hole,
14 transversal extension of the hole,
16 threaded elongated top part,
18 sliding element,
20 threaded aperture in the sliding element,
22 annular washer,
24 inner concave surface of annular washer,
26 screws,
28 curved surface of the sliding element,
30 sidewalls,
32 end walls,
34 inner concave surface of the base part,
36 markings on the outer convex surface of the base part,
38 center hole in the annular washer,
40 anchoring element,
42 anchor walls,
44 bottom surface of the anchor element,
46 guiding protrusions,
48 connectors of the anchoring element, and
50 connectors of the base part for fixing the anchoring element to the base part.

The invention claimed is:

1. A jointing (2) for a piece of furniture leg element (4), the jointing (2) comprising:
a base part (6) configured to be attached to a piece of furniture, the base part (6) comprising a convex outer surface (8), which is configured to face the leg element (4), and which outer surface (8) further comprises an elongated hole (10) defining a longitudinal extension (12) and a transversal extension (14),
an elongated threaded top part (16) configured to be fixed to the leg element (4) and having a cross-sectional dimension not exceeding the transversal extension (14) of the hole (10), and
a sliding element (18) having a dimension which is larger than the transversal extension (14) of the hole (10) and being configured to slide along an inner side (34) of the convex outer surface (8) of the base part (6) and having a threaded aperture (20) configured for cooperating with the threaded top part (16) in such a way that the leg element (4) is fixed to the base part (6) by screwing the top part (16) in the sliding element (18), and thereby enabling the leg element (4) to be fixed at a certain angle relative to the piece of furniture,
wherein the base part (6) further comprises:
two sidewalls (30) extending from an inner side (34) of the convex surface (8) and placed on each side of the longitudinal hole (10), said sidewalls (30) being substantially parallel to the longitudinal extension (12) of the hole (10) for guiding the movement of the sliding element (18) during adjustment of the angle which the leg element (4) forms relative to the piece of furniture, and
two end walls (32) extending from the inner side (34) of the convex surface (8) and placed adjacent to each end of the longitudinal hole (10), said end walls (32) being substantially perpendicular to the longitudinal extension (12) of the hole (10);
wherein the base part (6) further comprises an anchoring element (40) placed between the two sidewalls (30), the anchoring element (40) being configured for holding and guiding the sliding element (18),
wherein the anchoring element (40) has two parallel anchor walls (42), each of which anchor walls (42) is configured to be in abutment to a corresponding one of the sidewalls (30) of the base part (6),
wherein the two parallel anchor walls (42) are connected via a bottom surface (44), and where said bottom surface (44) has a form and curvature so that it is adapted to abut to and to follow a curvature of the inner concave surface (34) of the base part (6),
wherein said bottom surface (44) connecting the two parallel anchor walls (42) is equipped with an elongated hole corresponding to the elongated hole (10) in the outer convex surface (8) of the base part (6),
in that each of the two anchor walls (42) is equipped with one or more guiding protrusions (46) extending perpendicularly from said anchor walls (42), and
in that said guiding protrusions (46) are placed at a distance from the bottom surface (44) that corresponds to the height of the sliding element (18).

2. The jointing (2) according to claim 1, wherein the outer convex surface (8) of the base part (6) is formed as a ball cut.

3. The jointing (2) according to claim 2, wherein a surface (28) of the sliding element (18) which faces the inner side (34) of the convex surface (8) has the same curvature as said inner side (34) of the convex surface (8).

4. The jointing (2) according to claim 2, wherein the outer convex surface (8) of the base part (6) is provided with markings (36), which are configured to indicate the angular position of the leg element (4).

5. The jointing (2) according to claim 2, further comprising an annular washer (22) to be placed between the convex outer surface (8) of the base part (6) and the leg element (4).

6. The jointing (2) according to claim 1, wherein a surface (28) of the sliding element (18) which faces the inner side (34) of the convex surface (8) has the same curvature as said inner side (34) of the convex surface (8).

7. The jointing (2) according to claim 6, wherein the outer convex surface (8) of the base part (6) is provided with markings (36), which are configured to indicate the angular position of the leg element (4).

8. The jointing (2) according to claim 6, further comprising an annular washer (22) to be placed between the convex outer surface (8) of the base part (6) and the leg element (4).

9. The jointing (2) according to claim 1, wherein the outer convex surface (8) of the base part (6) is provided with markings (36), which are configured to indicate the angular position of the leg element (4).

10. The jointing (2) according to claim 9, further comprising an annular washer (22) to be placed between the convex outer surface (8) of the base part (6) and the leg element (4).

11. The jointing (2) according to claim 1, further comprising an annular washer (22) to be placed between the convex outer surface (8) of the base part (6) and the leg element (4).

12. A piece of furniture comprising a plurality of leg elements (4) and jointings (2) for connecting each of the leg elements (4) to a main part of the furniture, wherein each jointing (2) comprises:

a base part (6) attached to the main part of the furniture, the base part (6) comprising a convex outer surface (8), which faces one of the leg elements (4), and which outer surface (8) further comprises an elongated hole (10) defining a longitudinal extension (12) and a transversal extension (14), an elongated threaded top part (16) fixed to said leg element (4) and having a cross-sectional dimension not exceeding the transversal extension (14) of the hole (10), and a sliding element (18) having a dimension which is larger than the transversal extension (14) of the hole (10) and being configured to slide along the inner side (34) of the convex outer surface (8) of the base part (6) and having a threaded aperture (20) configured for cooperating with the threaded top part (16) in order for said leg element (4) to be fixed to the base part (6) by screwing the top part (16) in the sliding element (18), and thereby enabling said leg element (4) to be fixed at a certain angle relative to the main part of the furniture, wherein the base part (6) further comprises:

two sidewalls (30) extending from the inner side (34) of the convex surface (8) and placed on each side of the longitudinal hole (10), said sidewalls (30) being substantially parallel to the longitudinal extension (12) of the hole (10) for guiding the movement of the sliding element (18) during adjustment of the angle which said leg element (4) forms relative to said piece of furniture, and two end walls (32) extending from the inner side (34) of the convex surface (8) and placed adjacent to each end of the longitudinal hole (10), said end walls (32) being substantially perpendicular to the longitudinal extension (12) of the hole (10), wherein the base part (6) further comprises an anchoring element (40) placed between the two sidewalls (30), the anchoring element (40) being configured for holding and guiding the sliding element (18), wherein the anchoring element (40) has two parallel anchor walls (42), each of which anchor walls (42) is configured to be in abutment to a corresponding one of the sidewalls (32) of the base part (6), wherein the two parallel anchor walls (42) are connected via a bottom surface (44), and where said bottom surface (44) has a form and curvature so that it is adapted to abut to and to follow, a curvature of the inner concave surface (34) of the base part (6), wherein said bottom surface (44) connecting the two parallel anchor walls (42) is equipped with an elongated hole corresponding to the elongated hole (10) in the outer convex surface (8) of the base part (6), each of the two anchor walls (42) is equipped with one or more guiding protrusions (46) extending perpendicularly from said anchor walls (42), and in that said guiding protrusions (46) are placed at a distance from the bottom surface (44) that corresponds to the height of the sliding element (18).

13. The furniture according to claim 12, wherein the outer convex surface (8) of the base part (6) is formed as a ball cut.

14. The furniture according to claim 13, wherein a surface (28) of the sliding element (18) which faces the inner side (34) of the convex surface (8) has the same curvature as said inner side (34) of the convex surface (8).

15. The furniture according to claim 12, wherein a surface (28) of the sliding element (18) which faces the inner side (34) of the convex surface (8) has the same curvature as said inner side (34) of the convex surface (8).

16. The furniture according to claim 12, wherein the outer convex surface (8) of the base part (6) is provided with markings (36) which are configured to indicate the angular position of the leg element (4).

17. The furniture according to claim 12, further comprising an annular washer (22) to be placed between the convex outer surface (8) of the base part (6) and the leg element (4).

18. The furniture according to claim 12, wherein the main part of the furniture is a table top or a frame element attached to a table top, and the leg element (4) is a table leg.

19. The furniture according to claim 12, wherein the main part of the furniture is a chair seat or a frame element attached to a chair seat, and the leg element (4) is a chair leg.

20. The furniture according to claim 12, wherein the furniture is a dresser or cabinet.

* * * * *